United States Patent
Henig et al.

(10) Patent No.: US 12,545,049 B2
(45) Date of Patent: Feb. 10, 2026

(54) METHOD OF MANUFACTURING A RIM, RIM, AND TOOL DEVICE

(71) Applicant: DT SWISS INC., Grand Junction, CO (US)

(72) Inventors: Andreas Henig, Biel (CH); Thomas Renfer, Lengnau (CH)

(73) Assignee: DT SWISS INC., Grand Junction, CO (US)

( * ) Notice: Subject to any disclaimer, the term of this patent is extended or adjusted under 35 U.S.C. 154(b) by 571 days.

(21) Appl. No.: 18/064,457

(22) Filed: Dec. 12, 2022

(65) Prior Publication Data
US 2023/0182502 A1    Jun. 15, 2023

(30) Foreign Application Priority Data

Dec. 13, 2021   (DE) .................. 10 2021 006 134.9

(51) Int. Cl.
*B29C 70/54*    (2006.01)
*B29C 70/30*    (2006.01)
*B60B 5/02*    (2006.01)

(52) U.S. Cl.
CPC ............. *B60B 5/02* (2013.01); *B60Y 2200/13* (2013.01)

(58) Field of Classification Search
CPC ..... B29C 70/30; B29C 70/446; B29C 70/462; B29C 70/541; B29C 70/543
See application file for complete search history.

(56) References Cited

U.S. PATENT DOCUMENTS

| | | | | |
|---|---|---|---|---|
| 4,030,754 A | * | 6/1977 | Merlette | B29D 99/0032 |
| | | | | 301/95.103 |
| 4,314,964 A | * | 2/1982 | Ferrary | B62J 6/20 |
| | | | | 264/516 |
| 4,950,438 A | | 8/1990 | Nakamura et al. | |
| 6,347,839 B1 | * | 2/2002 | Lew | B60B 21/062 |
| | | | | 301/95.102 |

(Continued)

FOREIGN PATENT DOCUMENTS

DE    102010042752 A1    4/2012

OTHER PUBLICATIONS

European Search Report received for Application No. 22211074.4, mailed May 24, 2023.

(Continued)

*Primary Examiner* — Matthew J Daniels
(74) *Attorney, Agent, or Firm* — Greer, Burns & Crain, Ltd

(57) ABSTRACT

A manufacturing method for a fibrous composite bicycle rim, and a tool having two molding devices and one circular device. The two molding devices each have one flank contact surface. A molding device is selected and a matching auxiliary molding part is connected therewith, forming a mold surface for the rim base. A first fiber composite layer is applied to the molding device and the auxiliary molding part. The other molding device is covered with a first fiber composite layer, forming the layer of the other rim flank. A circular device is formed of annular segments has a circumferential rim well contact surface and is covered by a first fiber layer, which forms the rim well. The circular device and the molding devices are connected. The fibrous composite material is allowed to set, the annular segments and the molding devices are removed, and the rim is taken out.

10 Claims, 5 Drawing Sheets

(56) References Cited

U.S. PATENT DOCUMENTS

| | | | |
|---|---|---|---|
| 6,761,847 B2 | 7/2004 | Meggiolan | |
| 7,934,778 B2 | 5/2011 | Denk et al. | |
| 8,070,235 B2 | 12/2011 | Reuteler | |
| 9,616,704 B2 | 4/2017 | Werner et al. | |
| 11,142,020 B2 | 10/2021 | Christensen et al. | |
| 2002/0108249 A1* | 8/2002 | Meggiolan | B60B 21/025 156/242 |
| 2004/0227393 A1 | 11/2004 | Meggiolan | |
| 2005/0062337 A1* | 3/2005 | Meggiolan | B60B 5/02 301/95.102 |
| 2008/0265656 A1 | 10/2008 | Heyse | |
| 2008/0315677 A1* | 12/2008 | Granieri | B60B 21/04 301/104 |
| 2010/0090518 A1* | 4/2010 | Schiers | B60B 21/026 156/154 |
| 2012/0242138 A1* | 9/2012 | Tsai | B60B 21/00 156/245 |
| 2016/0243732 A1* | 8/2016 | Wissler | B29C 43/027 |
| 2024/0424748 A1* | 12/2024 | Wang | B60B 1/043 |

OTHER PUBLICATIONS

Search Report received in German Application No. 10 2021 006 134.9, dated Aug. 29, 2022.
Wikipedia DE, Description of "Gelcoat," retrieved from https://de.wikipedia.org/wiki/Gelcoat on Nov. 6, 2020, 1 page.

* cited by examiner

METHOD OF MANUFACTURING A RIM, RIM, AND TOOL DEVICE

BACKGROUND

The invention relates to a method of manufacturing a rim from a fibrous composite material for vehicles which as a rule are at least partially muscle-powered in use as intended, and, in particular, bicycles, and a rim manufactured by way of the method according to the invention and a tool device with which the method can be implemented.

The prior art has disclosed rims of fiber-reinforced plastics which allow reduction of the weight of the rims. At the same time, given a lower total weight, these rims achieve a stability comparable to, or even higher than, metal rims. A drawback of these rims is, however, the complicated manufacture since many manufacturing steps require mostly manual work, resulting in high costs. Moreover, the many manual process steps are susceptible to errors, which may increase the reject rate, thus further increasing the production costs. On the other hand, high-quality bicycle rims are not produced in large enough quantities so that developing and setting up fully automatic production would pay off.

It is therefore the object of the present invention to provide a method of manufacturing a rim from a fibrous composite material, which allows manufacturing of rims of a better quality and preferably involving a lower reject rate. Furthermore, an appropriate tool is provided.

SUMMARY

The method according to the invention serves to manufacture a rim from a fibrous composite material for vehicles at least partially muscle-powered (in typical operation as intended) and, in particular, bicycles, and is implemented using a tool device having two molding devices. The tool device comprises two molding devices, for example a left-side molding device and a right-side molding device. The tool device furthermore comprises a circular device (ring device).

The method is carried out by way of the following process steps in this or another useful sequence:

One molding device of the two molding devices is selected and provided. The molding device comprises a flank contact surface for forming a lateral (and for example the left-side or the right-side) rim flank (side wall).

An auxiliary molding part of the tool device matching the selected molding device is connected with the selected molding device, so that the selected molding device together with the auxiliary molding part forms a mold surface for the rim base runs around (circling) the axis of symmetry of the rim, which is configured in sections on the selected molding device and in sections, on the auxiliary molding part.

(At least) one first fiber layer of the at least one fibrous composite material is applied to the flank contact surface of the selected molding device, which forms the visible layer of at least the greater part of or the mayor part of the visible surface, and in particular nearly the entire, or the entire, visible surface of the pertaining (for example the left-side) rim flank, wherein the first fiber layer is not only applied to the flank contact surface of the selected molding device, but is also applied to the rim base region of the auxiliary molding part, so as to form a continuous first fiber layer in the region of the rim base. (It is particularly preferred and advantageous for the first fiber layer to take the cross sectional shape of the rim in the region of the rim base, on the selected molding device and the auxiliary molding part. The first fiber layer is thus pre-shaped and will retain the cross sectional shape configured, even after removing the auxiliary molding part.)

The other of the molding devices is provided, which comprises a flank contact surface for forming the other (and opposite) lateral rim flank. This rim flank may for example form the right-side rim flank or in reverse, correspondingly form the left-side rim flank.

(At least) one first fiber layer of the at least one fibrous composite material is applied to the flank contact surface of the other of the molding devices, which, as a visible layer, forms at least the greater part of or the mayor part of the visible surface, and, in particular, nearly the entire, or the entire, visible surface of the other rim flank.

A plurality of annular segments is connected to form a circular device with a (radially inwardly) circumferential rim well contact surface, on which at least one first fiber layer of the fibrous composite material is applied, forming the rim well.

The circular device is placed against one of the molding devices (for example the left-side or the right-side molding device). The other molding device (the corresponding, right-side or left-side molding device) is placed against it, and the circular device and the molding devices are connected with one another.

The fibrous composite material is allowed to set and, in particular, hardened, and the annular segments and the molding devices are removed, and the rim is taken out.

The rim is thus substantially completed. Thereafter, spoke holes if any may be made.

The method according to the invention has many advantages. A considerable advantage of the method according to the invention is that the visible surfaces which in operation as intended are external, are (directly) shaped and formed by the molding devices, on which first fiber layers are applied. This results in a homogeneous, reproducible full-surface placement of the fiber layers on the molding devices of the tool device.

The surface quality of the rim flanks (side walls) can be considerably improved due to the fact that the entire visible outer surface of the finished rim ensues by way of surfaces directly resting against the molding devices of the tool device. The quantity of air pockets and other defects can be significantly reduced, so as to enable noticeable reduction of the reject rate. The process is less susceptible to errors. A fiber distortion in the fiber layers may also be reduced and largely prevented, so that the quality and stability of the rim thus manufactured is increased. The position and orientation of the fibers in the outer fiber layers is defined at all times, thus improving the stability and the visual appearance.

The improved visual appearance of the manufactured rim thus provides the opportunity to manufacture the rim "out of the mold". The clearly defined shape and position of the fiber layers and the fibers contained therein greatly reduce flaws in the hardened rim.

In contrast to this, the prior art discloses methods wherein fiber layers are firstly inserted in an auxiliary tool. A bundle of fiber layers thus premolded is then transferred to, and inserted in, the tool proper. During transfer of the fiber layers, some fibers and fiber layers may be displaced, so that the position and shape of each of the fiber layers is not always reproducible. However, thus far the method has been carried out in this way among other things since the tool proper is so heavy that it cannot readily be transported manually by one person (or several persons). With the invention, however, one single person can readily transport each of the parts of the tool device separately. This is why at any rate the visible layers and also the reinforcement layers can be directly placed in the mold.

The two molding devices together in particular form the entire outer shape of the rim flanks and the rim base. Particularly preferably, the two molding devices are joined in a plane oriented perpendicular to the axis of symmetry of the rim. The two molding devices in particular meet in the deepest place of the rim base. The deepest place of the rim base is that place protruding radially furthest inwardly. The rim is, in particular, configured convex. The rim may have a V- or U-shape. Preferably, the widest spot of the rim lies between the radially outwardly end of the rim (at the rim flanges) and a radially inwardly end, at the rim well.

Preferably, the fiber layers are inserted in the tool units, and the outer layers visible on the finished rim are pressed directly against the tool units. Preferably, each of the molding devices form the entire visible region of the rim flanks. The circular device preferably forms the visible region of the rim well.

In a preferred specific embodiment, the fiber layers are pressed against the molding devices of the tool device, to ensure full-surface contact between the fiber layers and the flank contact surfaces (side wall contact surfaces). This avoids air pockets and flaws, and thus enhances the quality.

In particularly preferred specific embodiments, all the fiber layers, which in use as intended, as visible layers, form the visible outer surfaces, are pressed against the molding devices and the circular device of the tool device, to ensure full-surface contact between the fiber layers and the flank contact surfaces. This improves the structure and the quality.

Refinishing work to the visible surface and, in particular, re-varnishing the outer surface to cover up air pockets and other flaws can be avoided. This results in a particularly advantageous method. The fact that the visible surfaces do not require any re-varnishing, saves another method step, thus reducing the costs. It is another considerable advantage that the total weight of the rim is reduced since the weight of a layer is omitted.

In particularly advantageous configurations, an auxiliary molding part of the tool device is used. An auxiliary molding part of the tool device matching the selected molding device is connected with the previously selected molding device, so that the (selected) molding device together with the auxiliary molding part forms a (shared) mold surface for the rim base circling the axis of symmetry of the rim. The mold surface for the rim base is configured in sections on the selected molding device and in sections, on the auxiliary molding part.

In this configuration, the first fiber layer is not only applied to the flank contact surface of the selected molding device, but the first fiber layer is (integrally) also applied to the rim base region of the auxiliary molding part, so as to form a continuous first fiber layer in the region of the rim base. This continuous first fiber layer does not only extend over the rim base region of the (selected) molding device, but also over the rim base region or rim base mold region of the auxiliary molding part. Thus, the first fiber layer is preferably continuously applied to the flank contact surface of the selected molding device and to the rim base region of the auxiliary molding part, so as to provide a continuous and integral first fiber layer in the region of the rim base. These specific embodiments allow to manufacture a particularly robust and high-quality rim.

In preferred specific embodiments, the auxiliary molding part is then removed from the selected molding device, and (immediately thereafter or preferably later) the two molding devices covered with fiber layers are connected with one another. For removing the auxiliary molding part, particular care is taken so that the draped fiber layers in the region of the rim base retain their shape (approximately or at least substantially). The sections of the fiber layers protruding from the selected molding device in the region of the rim base, together with the fiber layers placed on the other of the molding devices, form the other of the rim flanks. The "protruding" sections, however, do not form a visible surface on the finished rim.

It is preferred that after removing the auxiliary molding part, the circular device is placed first, and thereafter, the other molding device is placed.

In simple configurations, the selected molding device is placed on a table which is for example horizontal, for laying fiber layers, and the first fiber layer and optionally further fiber layers are placed on the flank contact surface of the selected molding device and optionally on the auxiliary molding part, and pressed against the pertaining contact surfaces. In parallel or thereafter or before, the other of the molding devices is for example placed on an e.g. horizontal table, and a first fiber layer is laid on the other of the molding devices, and optionally, further fiber layers are placed on the other of the molding devices.

The circular device may be covered with the fiber layers in parallel or before or after. After removing the auxiliary molding part, the circular device is placed on the selected molding device with the fiber layers placed on the rim well contact surface. Thereafter, the other of the molding devices with the placed fiber layers may be placed on the selected molding device and the circular device. Given this configuration, each of the molding devices is placed step by step on a horizontal table. Alternately it is possible for the table to be disposed at an angle to the horizontal, or for the molding devices to be positioned vertically in the space, and for the fiber layers to be pressed against the pertaining molding devices from the side.

In preferred specific embodiments, the first fiber layer placed on the selected molding device forms the visible layer with the visible surface of the pertaining rim flank in the region of the flank contact surface, and in the rim base region of the auxiliary molding part, a reinforcement layer of the rim base, but not the visible layer with the visible surface of the other of the rim flanks. This achieves an advantageous connection of the two halves. The two halves of the rim may be configured symmetrically or asymmetrically.

Preferably, the visible rim base is formed by the radially inwardly regions of the rim flanks, respectively by the radially inwardly regions of the first fiber layers which are placed on the selected molding device respectively the other of the molding devices.

In advantageous configurations, the two molding devices and the auxiliary molding part each comprise a mold parting surface or contact surface running perpendicular to the axis of symmetry of the rim. Each of the molding devices and the auxiliary molding part can be selectively placed against one another at the contact area (of the mold parting surface). Thus, the auxiliary molding part is preferably first placed against the selected molding device, and removed after placement of the appropriate fiber layers. Thereafter, the other of the molding devices with the pertaining mold parting surface is placed against the mold parting surface of the selected molding device.

Preferably, at least one reinforcement layer is inserted in the interconnected molding devices (at least in the region of the rim base).

A method omitting the use of an auxiliary molding part is likewise conceivable. Then, the molding devices are first covered separately, each with first fiber layers as the visible layers. Thereafter, the two molding devices may be joined, and at least one reinforcement or joint layer may be placed on the rim base from radially outwardly. Thereafter, single annular segments covered with fiber layers might be inserted from the outside, which are thereafter carefully removed, leaving the placed fiber layers. Thereafter, a circumferential, outer fiber layer might be placed, and the annular segments could be reinserted and connected to the circular device. Thereafter, hardening may be carried out.

What is particularly preferred is a sequence of method steps wherein the auxiliary molding part is placed on the selected molding device, the auxiliary molding part is removed after placing first fiber layers, and the circular device with the fiber layers previously placed thereon, is placed. Finally, the other of the molding devices with the fiber layers placed thereon is placed.

In all the configurations it is preferred for rim flanges to be configured on the two rim flanks. In particular, at least one rim flange is at least partially formed by fiber layers, which are placed on one of the molding devices and on the circular device. This means that a rim flange is preferably formed both by fiber layers placed on a molding device, and also by fiber layers placed on the circular device. This increases stability.

In advantageous specific embodiments, at least one roving is inserted for reinforcement in the region where the rim well intersects the rim flank. This roving may consist of a plurality of filaments, or of a bundle of filaments, or may comprise filaments. Alternately it is possible to use for rovings, for example braided filaments or corded or twisted filaments. These inserted rovings can reinforce the crossing regions between the rim well and the rim flank and the rim flange.

In all the configurations it is preferred for the circular device to comprise, in the peripheral direction, at least two and, in particular, three or more annular segments. Particularly preferably, there are three annular segments in the peripheral direction. It is also possible to use two annular segments only, extending over an angle of 180° each. Preferably, three annular segments are used, so that each of the annular segments extends over an angle at circumference of clearly less than 180°. Preferably, the annular segments are configured identically, so that in the case of three annular segments, each preferably covers an angular range of 120°. It is also conceivable for each of the annular segments to extend over different angular ranges. The annular segments all together extend over the entire circumference.

Preferably, the circular device comprises, in the axial direction (parallel to the axis of symmetry of the rim) transverse to the peripheral direction, at least two and, in particular, three or more annular segments. It is thus possible for the circular device to consist of nine annular segments in total. Each three annular segments together form a ring. The three rings (having three annular segments each) are disposed sequentially in the axial direction. The annular segments may be disposed at an offset in the axial direction. The annular segments in total form the circular device, which radially inwardly forms the rim well contact surface.

The axially central annular segments may, in particular, be configured in a wedge shape. This allows first removal of the central annular segments after manufacture. Thereafter, the other annular segments may be removed, which for example form an undercut on the rim flanges, to provide radially inwardly protruding ends of the rim flanges.

Alternately, it is conceivable for the axially central annular segments all together to form a disk-shaped ring instead of a wedge shape. Also in this case, the axially outwardly annular segments may form an undercut on the rim flanges.

In advantageous configurations, a locking ring is provided, which is placed outwardly around the interconnected molding devices and the circular device. The locking ring may be placed radially from the outside, reinforcing the coherence between the components. In this respect, the locking ring may be referred to as an external clamping ring. It is also possible to omit a locking ring, in particular, if the molding devices and the circular device can be interconnected in another way.

Preferably, the tool device loaded with the fiber layers is evacuated prior to hardening. Particularly preferably, the tool device is inserted into a pressure device and/or heated. This can aid in the setting or hardening of the fibrous composite material.

In all the configurations, it is particularly preferred to use fiber layers impregnated with at least one resin. These fiber layers provided or impregnated with matrix material (in particular, resin) may also be referred to as prepregs, and may preferably contain a quantity of matrix material (and preferably of resin) that is (at least substantially) sufficient for hardening. The use of prepregs is particularly advantageous. It is also conceivable to (additionally) insert matrix material or resin material into the completely loaded tool device. For example, matrix material or resin material may be injected or aspirated. It is also possible to use for prepregs, fiber layers, fiber mats, woven mats or the like, and to additionally insert (some) resin material.

In all the configurations it is preferred to insert an inflatable tube (into the region of what is to be the hollow space), before connecting the molding devices with the circular device. Preferably, the tube is inflated after fastening the molding devices to the circular device. An outwardly connection for inflating for example forms the valve opening intended for later. This allows subsequent removal of the tube.

It is preferred to insert spoke holes after removing the rim from the tool device.

Another method according to the invention of manufacturing a rim for at least partially muscle-powered vehicles and, in particular, bicycles is implemented by way of inserting fiber layers in tool units. Then, what are the visible, outer layers on the finished rim, are directly pressed against the tool units. This allows manufacturing of an advantageous rim, which does not require any, and at any rate no substantial, refinishing work of the (visible surface of the) outer rim.

A rim according to the invention for at least partially muscle-powered vehicles and, in particular, bicycles comprises opposite rim flanks, a rim well and a rim base, where the rim flanks meet in the radially most inwardly point. The rim is manufactured of at least one fibrous composite material by means of a method as described above. In a preferred specific embodiment, the outermost surface visible in operation as intended, consists at least predominantly or completely of the at least one fibrous composite material. This is true, apart from any rim eyelets and model designations, and e.g. stickers which are small compared to the rim surface, wherein the factor of the surface for example of stickers to the rim surface is less than $1/5$ or $1/10$ or $1/100$.

The rim according to the invention is very advantageous and provides a high surface quality and a reproducible, high quality, even without finishing the outside surface, and, in particular, without varnishing the outside surface.

The tool device according to the invention provides a rim for at least partially muscle-powered vehicles and, in particular, bicycles, the rim comprising opposite rim flanks, a rim well and a rim base, where the rim flanks meet, in particular, in the radially most inwardly point. The tool device comprises two molding devices and one circular device. The molding devices each comprise contact surfaces for forming one rim flank each. The circular device comprises a plurality of circumferentially composed annular segments. The radially inwardly region of the circular device shows a contact surface for forming the rim well.

The tool device is very advantageous and provides the option of manufacturing high-quality, reproducible rims, in particular, for bicycles.

Particularly preferably, the molding devices and/or the circular device consist of a light metal, and they are, in particular, manufactured and/or finished by chip removal. The contact surfaces of the molding devices and/or their units with the manufactured rim are preferably polished. Once again this increases the quality of the manufactured rim.

The circular device may, in particular, comprise an annular unit (with a core) of a less elastic material, and at least one ring cover of a more elastic material. Then, the ring cover forms the contact surface or at least part of the contact surface for forming the rim well. The molding devices, in particular, also comprise a core of a less elastic material than does the ring cover. This allows the ring cover to yield elastically, and to build up and transmit the required pressure to the side walls and the rim flanges and/or the rim well. At least part of the ring cover, in particular, consists at least partly of a rubber elastic or elastomeric material. Particularly preferably, the ring cover consists at least partially, or substantially, or nearly completely, or completely, of a silicone. Using silicone elastomerics, polyurethanes, or at least a silicone rubber is (also) possible. The annular unit or the core of the annular unit preferably consists substantially or (nearly) completely of at least one metallic material.

The tool device, in particular, comprises at least one auxiliary molding part, which, together with one of the molding devices, forms a mold surface for forming out the rim base. It is also possible to provide one auxiliary molding part for each of the two molding devices. Then, one of the molding devices may optionally be used with the matching auxiliary molding part.

It is possible and preferred for the molding devices and/or the circular device and/or the auxiliary molding part to show alignment units corresponding to one another. This reproducibly provides alignment of each of the molding devices with the circular device, respectively with the auxiliary molding part, to one another. For attaching the molding devices and the circular device respectively the auxiliary molding part to one another, appropriate fasteners are, in particular, provided, which can be mounted to corresponding attachment openings or to the alignment units. For example, screws, pegs, rivets, clamps or detent mechanisms or the like can be used for fasteners.

In all the configurations it is preferred for each of the molding devices and the circular device to have a weight of less than 35 kilos and, in particular, less than 30 kilos or less than 25 kilos and particularly preferably, less than 20 kilos or 15 kilos. At least one molding device, in particular, has a weight of less than 15 or less than 12 or less than 10 kg. When assembled, the two molding devices and the circular device preferably have a total weight of less than 35 kilos or less than 30 kilos or even less than 20 kilos. This would permit one person to move each of the units and the entire tool device alone, and without requiring the help of another person. Comfortable handling for two persons is feasible at any rate. This facilitates manufacturing.

The fact that the tool device comprises compact molding devices and a compact circular device, which parts are manufactured by turning or milling, quite considerably reduces the manufacturing costs for a tool device. This allows employment of a larger quantity of tool devices for production in parallel. Rims can be manufactured in a higher quality, generating lower costs, and moreover requiring minor refinishing of the visible surfaces or none at all.

Further advantages and features of the present invention can be taken from the exemplary embodiments which will be discussed below with reference to the enclosed figures.

DETAILED DESCRIPTION

Figure 1:
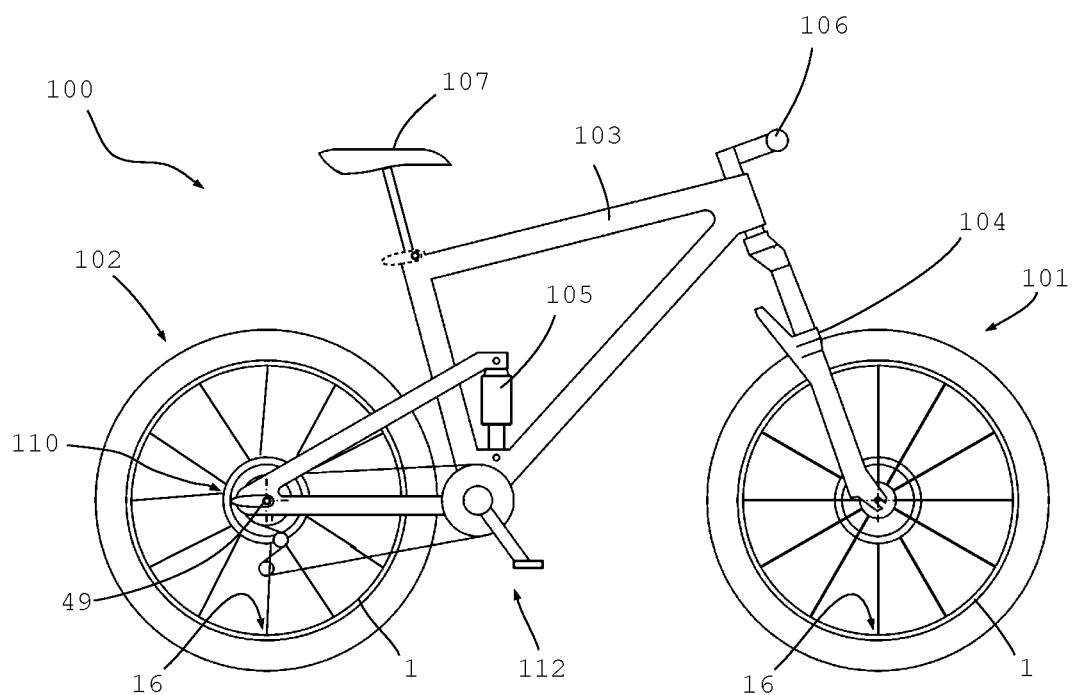
FIG. 1 a schematic illustration of a mountain bike with rims according to the application.
Figure 2:
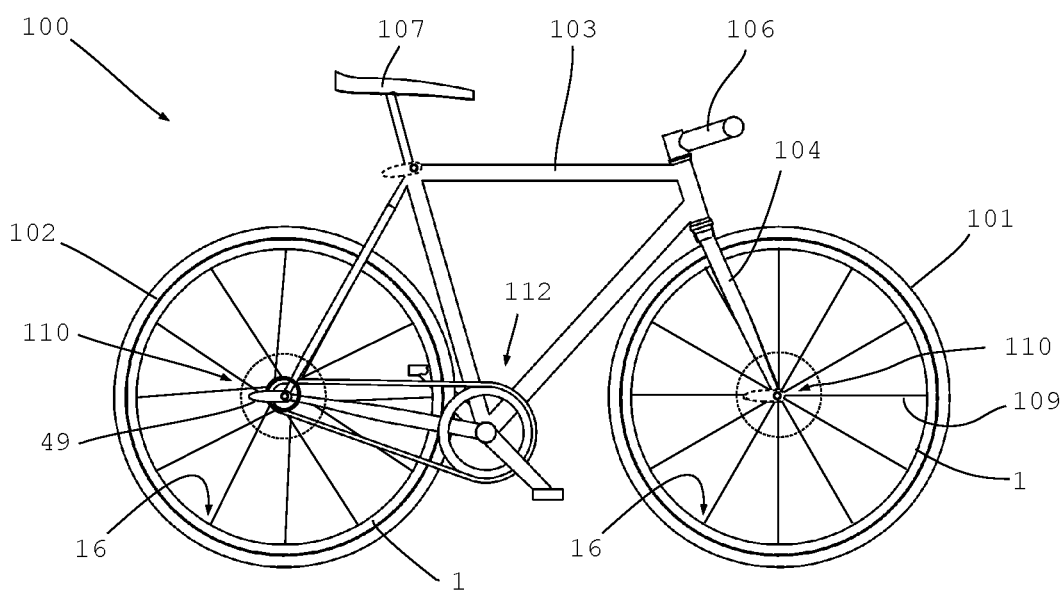
FIG. 2 a schematic illustration of a racing bicycle with rims according to the application.

The FIGS. 1 and 2 each show a mountain bike respectively racing bicycle 100, each equipped with rims 1 according to the application. The mountain bike respectively racing bicycle 100 is provided with a front wheel 101 and a rear wheel 102, where rims 1 according to the application are employed. The two wheels 101, 102 are provided with spokes 109 connecting the rim 1 with the hubs 110. To this end, the rim 1 is provided with spoke holes 16.

A bicycle 100 comprises a frame 103, a handlebar 106, a saddle 107, a fork or suspension fork 104 and in the case of the mountain bike, a rear wheel damper 105 may be provided. A pedal crank 112 with pedals serves for driving. Optionally, an electric auxiliary drive may be provided on the pedal crank 112 and/or the wheels. The hubs 110 of the wheels may be attached to the frame by means of a clamping system 49 (for example a through axle or a quick release).

Figure 3:
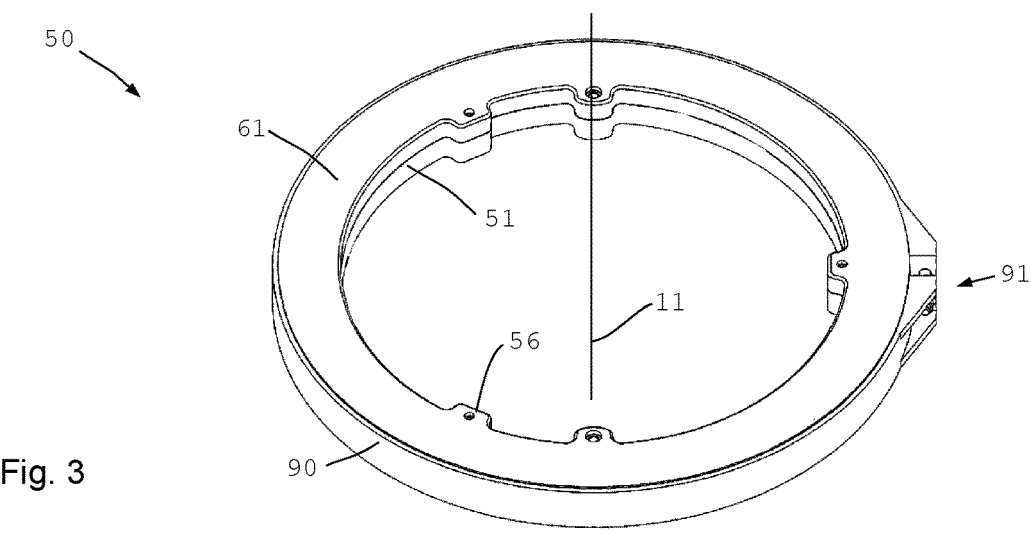
FIG. 3 a schematic total view of a tool device according to the application for manufacturing a rim according to the application.

FIG. 3 shows the tool device 50 in the assembled state with the fiber layers already inserted to manufacture the rim 1, prior to inserting the tool device 50 into a separate pressure device, in which the tool device 50 is also heated to accelerate the hardening of the fibrous composite material. The tool device 50 is substantially configured rotationally symmetrical around an axis of symmetry 11, which at any rate forms an axis of symmetry for the finished rim 1.

Figure 4:
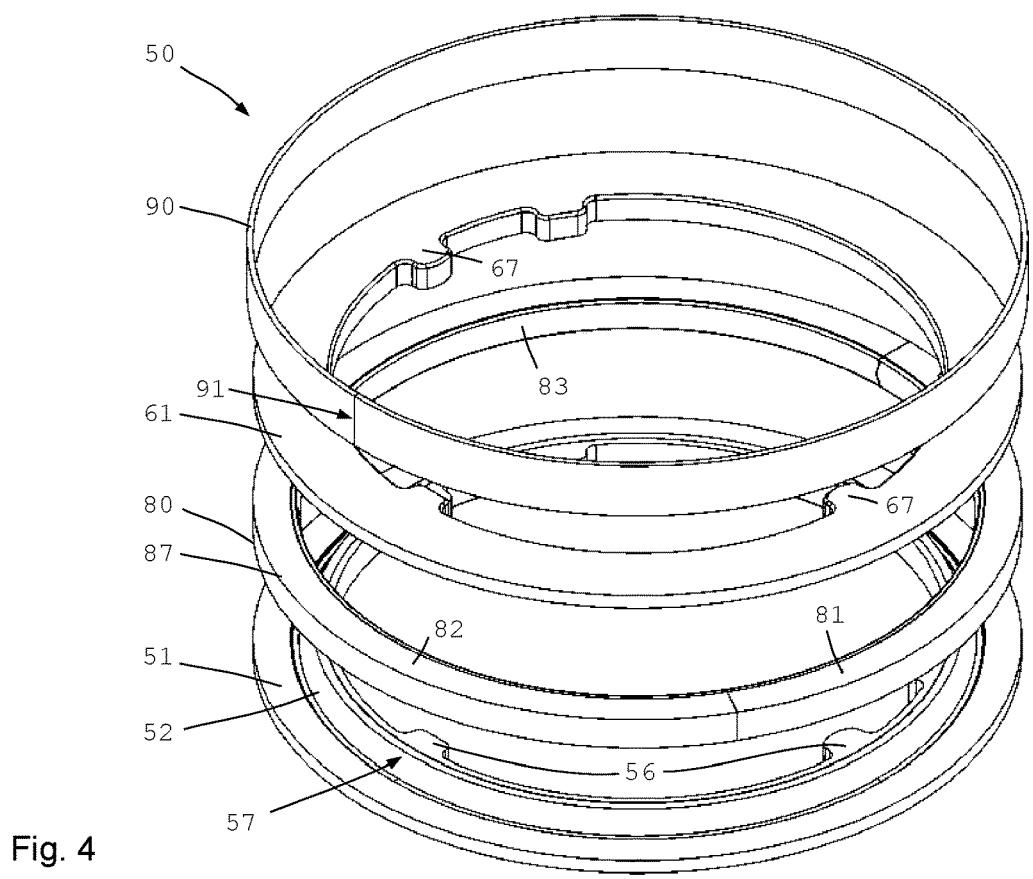
FIG. 4 an exploded view of the different components of the tool device according to FIG. 3.

FIG. 4 shows an exploded view of the tool device 50, at the top of which a locking ring 90 is illustrated that is provided with a clamping portion 91 and a screw, not visible. The locking ring 90 may be placed around the further components of the tool device 50, and may serve as a clamping ring. Optionally, this locking ring 90 may be omitted.

The bottommost component illustrated is a molding device 51, including a flank contact surface 52 which serves to form one of the two rim flanks of the rim 1 manufactured. The molding device 51 has fasteners 56 and configured or disposed thereat, alignment units 57, to which the molding device 51 with the circular device 80 and the other of the molding devices 61 is fastened by means of appropriate fasteners 56, or to the alignment units 57. The circular device includes alignment units 87, and the other of the molding devices 61 includes alignment units 67.

As can be seen in FIG. 4, the circular device 80 or ring device 80 consists of a number of annular segments 81-83 extending in the peripheral direction around the central axis of symmetry 11. This allows separate removal of the annular segments.

Figure 5:
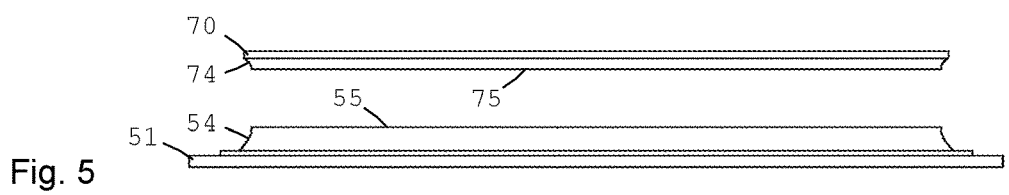
FIG. 5 a molding device and an auxiliary molding part of the tool device according to FIG. 4.

FIG. 5 shows a molding device 51 and the pertaining auxiliary molding part 70, which are interconnected to cover the flank contact surface 72 and the rim base regions 54 and 74 with fiber layers of the fibrous composite material. In this way, the region of the rim base is reinforced by one joint, continuous layer.

The molding device 61 and the auxiliary molding part 70 are interconnected with, respectively placed on top of, one another on the mold parting surfaces 55 and 75.

Figure 6:
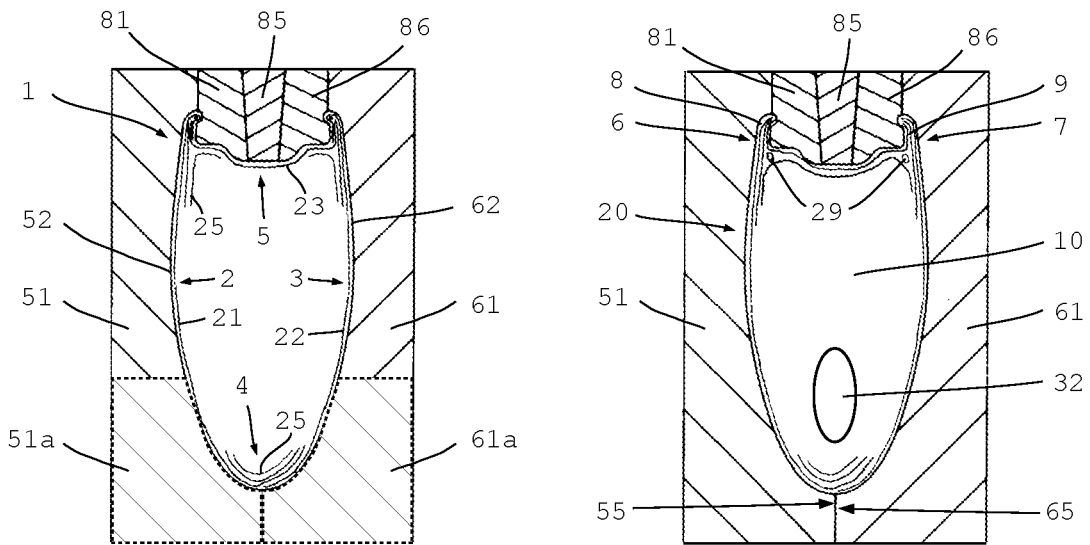
FIG. 6 two sectional views of the tool device while manufacturing a rim.

FIG. 6 shows two schematic illustrations of the tool device 50 and fiber layers 21-23 and 25 disposed therein. In the assembled state, the tool device substantially consists of a first molding device 51, a second molding device 61, and the circular device 80, which in turn consists (in the peripheral direction) of a number of annular segments 81-83 (see FIG. 4) and (in the axial direction) annular segments 85, 86.

Optionally, the molding devices 51 and 61 may be configured multipart and may for example additionally comprise molding parts 51a and 61a. Preferably, however, each of the molding devices 51 and 61 is configured as one piece. The molding device 51 has a flank contact surface 52 for the rim flank 2 on the left, while the rim flank 3 on the right is formed by a (side wall) flank contact surface 62. The flank contact surfaces 52 respectively 62 are covered with fiber layers 21 respectively 22. Reinforcement layers 25 are also applied in the region of the rim base 4. The rim well 5 is formed by at least one fiber layer 23, which is applied radially inwardly on the circular device 80.

The two rims 1 illustrated in FIG. 6 are each provided with rim flanges 6, 7, which are configured by fiber layers 21, 23 and 25. The outer surfaces 8 and 9 of the two rim flanks 2, 3, which will later be visible from the outside, are each formed by the first fiber layer 21 placed on the flank contact surface 52 and by the first fiber layer 22 placed on the flank contact surface 62. The visual range of the rim well is formed by the first fiber layer 23 placed on the circular device 80.

All the visible surfaces respectively all the visible layers of the finished rim 1 are thus provided by the fiber layers 21-23, each of which is applied separately and full-surface on the molding devices 51 and 61, and the circular device 80. This achieves a particularly high surface quality, since air pockets or other flaws can be avoided better than in the prior art.

To allow to apply pressure from the inside during hardening, a tube 32 (shown schematically only) is as a rule inserted, which can be guided outwardly through what is intended as the valve opening, and on which pressure can be applied after closing the tool device 50, to press each of the fiber layers 21-25 from the inside against the inner walls of the tool device 50. This secures a reliable composite. The tube 32 may be configured elastically, expanding when inflated. It is likewise possible and preferred for the tube 32 to be of sufficient size or matching configuration and with insertion, to be placed full-surface on at least one flank contact surface, and radially from the inside, placed full-surface on the circular device.

Optionally it is possible, as can be seen on the right in FIG. 6, to insert peripheral rovings or fiber bundles 29 in the intersection of the rim flank 2, 3 with the rim well 5, to reinforce those regions and configure them still more robust.

Figure 7:
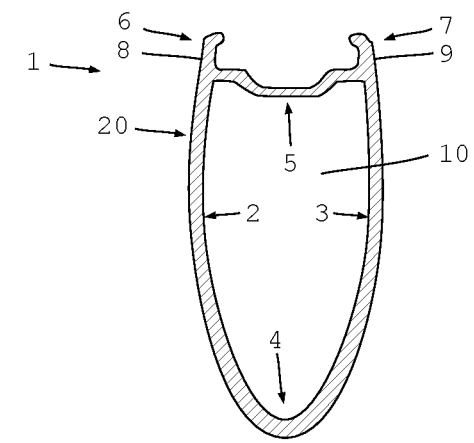
FIG. 7 a finished rim according to the application.

FIG. 7 shows a schematic illustration of a finished rim 1, comprising a rim base 4, a rim well 5, and rim flanks 2, 3, on which rim flanges 6, 7 are configured. A hollow space or hollow section 10 can be seen in the interior. The rim 1 is manufactured by way of a method according to the application and a tool device according to the application, of at least one fibrous composite material.

Figure 8:
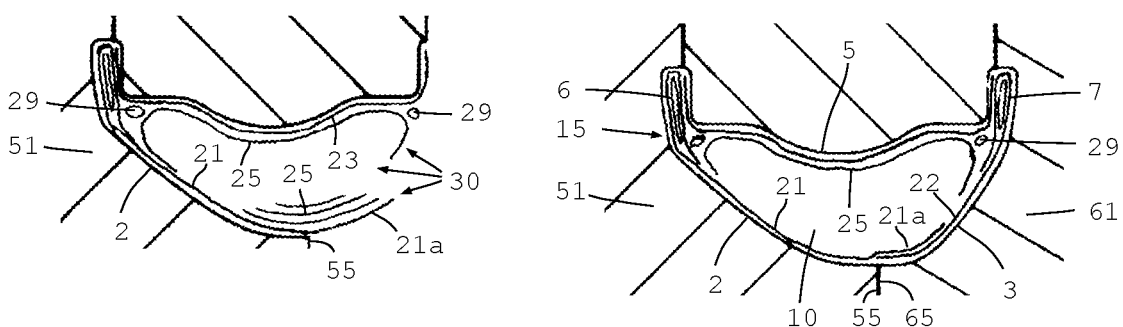
FIG. 8 sectional views of the tool device and of the fiber layers of a rim while implementing the method according to the application.

FIG. 8 shows two schematic illustrations during manufacture. What is shown is, simplistic illustrations of the fiber layers in a tool device 50, wherein the outlines and the positions of the fiber layers 21-23 and 25 are shown intentionally roughly to give an illustrative example of the outlines of each of the fiber layers. In the illustration on the right in FIG. 8 it can be seen that the fiber layer 21 was not only placed onto the flank contact surface 52 of the molding device 51, but also onto the rim base region 74 of the auxiliary molding part 70, to form a reinforcement section 21a in the region of the rim well contact surface 62 of the other of the molding devices 61. Thus, an overlap of each of the fiber layers is enabled from one of the rim flanks to the other of the rim flanks in the region of the rim base.

Circumferential rovings 29 are schematically shown, in the intersecting region 15 of the rim flanges 6, 7 with the rim well 5 respectively the rim flanks 2, 3 or side walls.

In the lower region, the mold parting surfaces 55 and 65 (contact areas) of the two molding devices 51 and 61 can be seen, where the two molding devices 51 and 61 are joined together.

FIG. 8 shows on the left, a pre-stage during manufacture of the rim 1 illustrated further to the right. FIG. 8 illustrates on the left, the state after connecting the selected molding device 51 with the auxiliary molding part 70, and placing fiber layers 21 and reinforcement layers 25 thereon, and after then removing the auxiliary molding part 70, and placing the circular device 80 on the selected molding device 51.

This results in the layer structure visible on the left in FIG. 8, wherein due to the inherent stiffness of the prepregs 30 used for fiber layers 21-23 and 25, the protruding reinforcement section 21a and the correspondingly protruding regions of the fiber layers 25 (substantially) retain their shape. Thereafter, the other of the molding devices 61 can be placed onto the (selected) molding device 51 and the circular device 80, so that on the whole, a closed rim profile results for the rim 1. Then, in the region of the rim flange 7, the fiber layer 22 placed on the molding device 61 is pressed against the fiber layer 23 on the circular device 80. In the region of the rim base, the fiber layer 22 is pressed against the reinforcement section 21. Then, the tube 32 inflated in the further process in the interior of the hollow space 10 of the rim 1, reliably presses all the layers against one another and outwardly against the molding devices 51 and 62 and the circular device 80.

The outer surfaces of the finished rim, which are particularly significant for the visual effect, are configured in a high quality, since what are the outside fiber layers 21, 22 and 23 forming the visible layers of the finished rim 1, are each separately pressed full-surface against the corresponding contact surfaces (flank contact surfaces 52, 62 and rim well contact surface 84).

Figure 9:
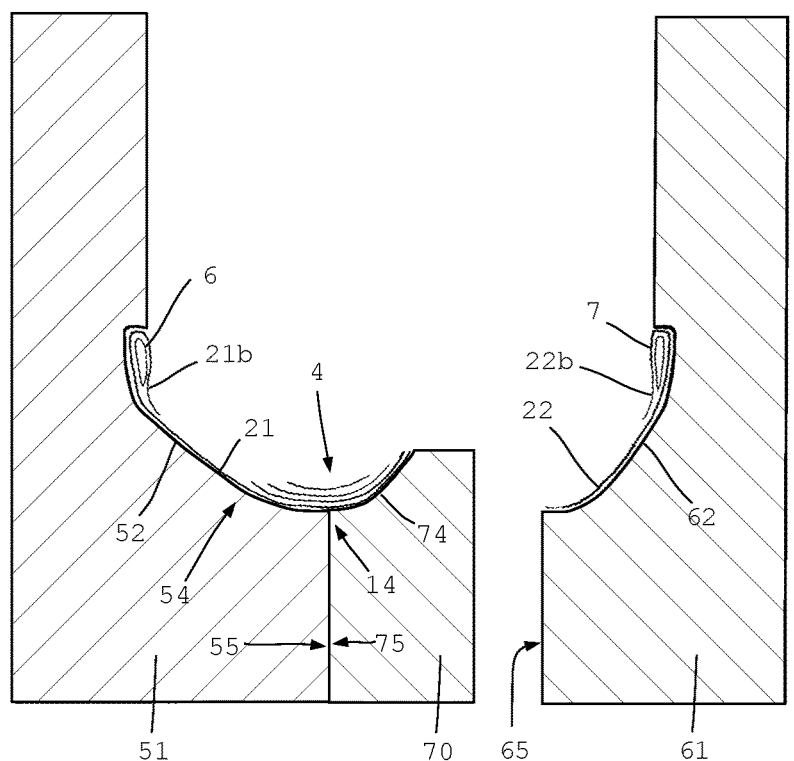
FIGS. 9-12 different sectional views while manufacturing rims according to the application.

FIG. 9 shows the state during manufacture of a rim 1, after placing a first fiber layer 21 onto the rim contact surface 52 of the selected molding device 51 and the rim base region 74 of the auxiliary molding part 70. Furthermore, reinforcement layers 25 have been placed, contacting the mold surface 14 for forming of the rim base 4 and assuming the corresponding shape. In the FIG. 9 on the left, the mold parting surfaces (contact surfaces) 55 and 75 of the molding device 51 and of the auxiliary molding part 70 are still in contact with one another.

In the radially outside region it can be seen that in the region of the rim flange 6, the fiber layer 21 has been folded over, forming a folded-over and radially inwardly extending section 21b for reinforcing the rim flange 6.

Accordingly, the other of the molding devices 61 is also loaded with fiber layers 22, wherein the fiber layer 22 only extends over the flank contact surface 62. In this spot, a section 22b is likewise folded over in the region of the rim flange 7.

Thereafter, the auxiliary molding part 70 is carefully removed, and the other of the molding devices 61 is approached with the mold parting surface 65 to the mold parting surface 55 of the (selected) molding device 51, where they are attached to one another. Preferably, however, this is done after placing the circular device 80 (not shown in FIG. 9) onto the selected molding device 51 (cf. e.g. FIG. 10).

Figure 10:
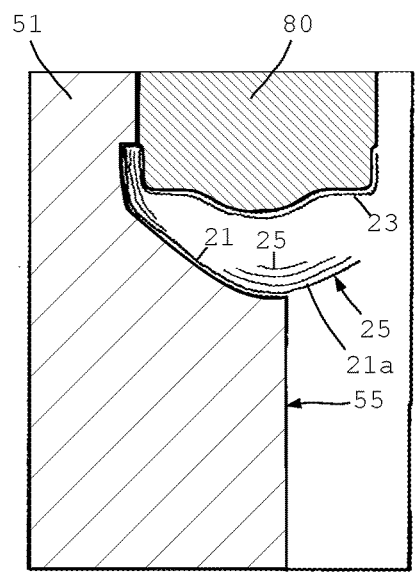
Figure 11:
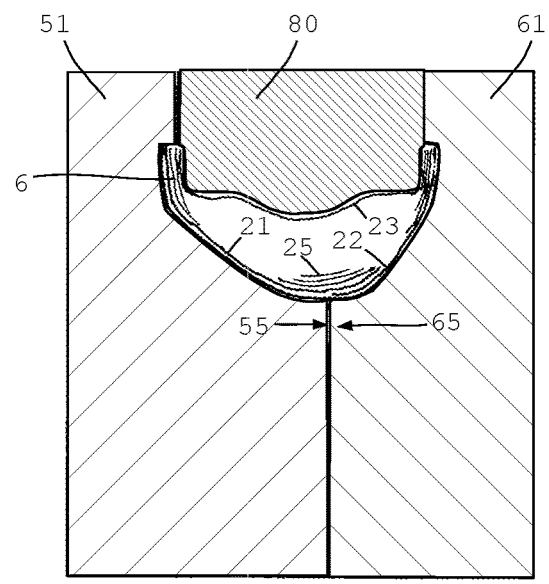

FIGS. 10 and 11 show various process steps in manufacturing a different rim having a different layer pattern, wherein FIG. 10 shows the state after placing fiber layers 21 and 25 on the rim contact surface 52 and the rim base region 74 of an auxiliary molding part, and then removing the auxiliary molding part 70. The protruding section 21a will later reinforce the rim base 4 in the region of the rim flank 3.

FIG. 11 shows the next step in the manufacture of the rim 1 according to FIG. 10, wherein the other of the molding devices 61 has been placed on the circular device 80 and the selected molding device 51. Now the entire layer pattern, which is exemplarily drawn in, can be seen.

Figure 12:
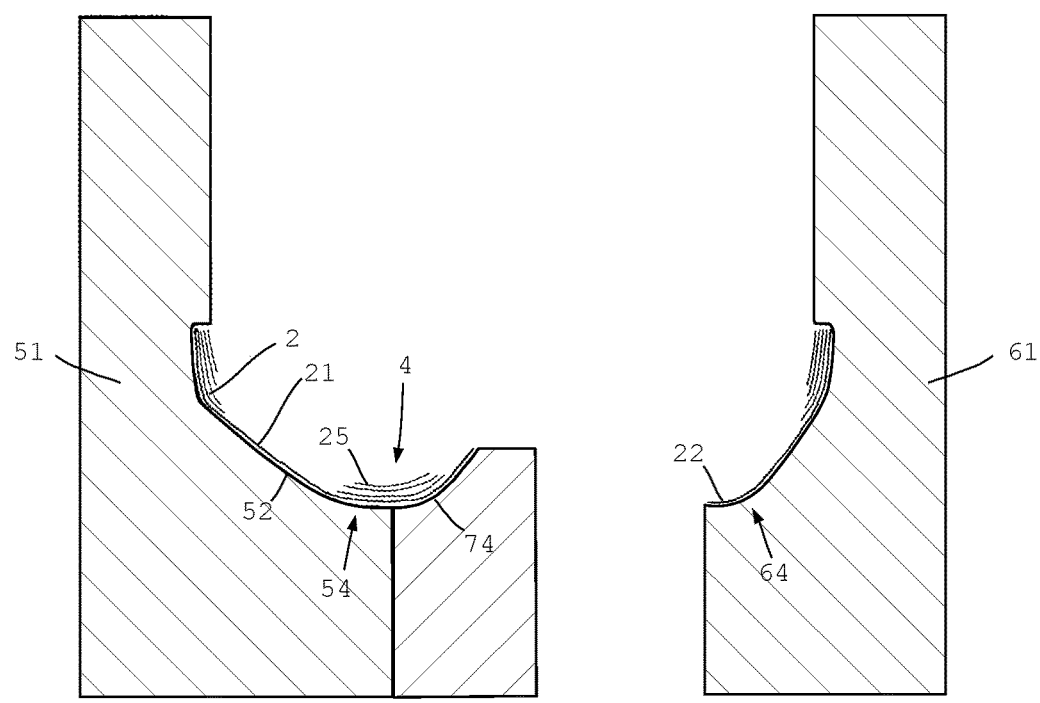

FIG. 12 shows an intermediate step in the manufacture of another rim 1, wherein on the left, the fiber layers 21 and 25 are illustrated, which have been placed on the selected molding device 51 and the rim base region 74 of the auxiliary molding part 70, while on the right in the FIG. 12 are shown the fiber layer 22 and the other fiber layers placed on the flank contact surface 62 and the rim base region 64.

Figure 13:
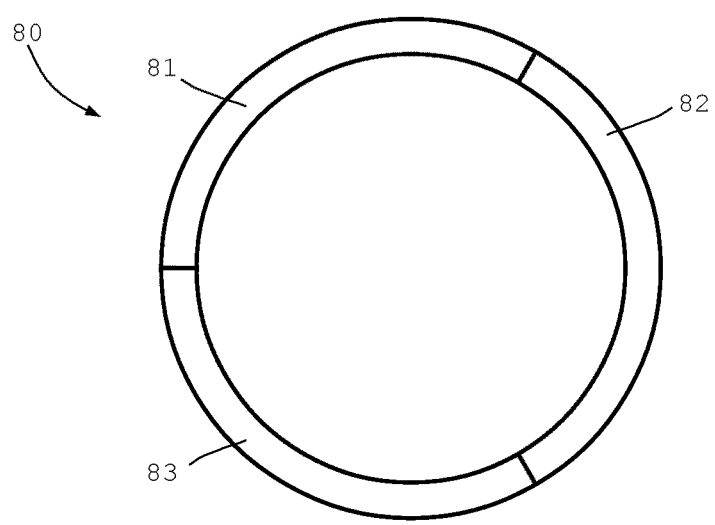
FIG. 13 a schematic plan view of the circular device of the tool device according to FIG. 3.

FIG. 13 finally shows a schematic plan view of the circular device 80, where the three circumferentially disposed annular segments 81-83 can be seen.

In all the configurations, the various fiber layers may be placed on top of one another at various angles relative to one another. Thus, in one layer the fibers (warp fibers or weft fibers of a woven material) may be aligned at 30°, 60° or 45° to the peripheral direction of the finished rim. In a layer disposed on top thereof, the corresponding fibers may be aligned at another angle (e.g. another of the angles listed).

On the whole, the invention provides an advantageous method and an advantageous tool device, with which to manufacture rims 1 having a reproducible, high quality. It is possible to provide a high surface quality of the outwardly visible surfaces, without complex refinishing work. An additional application of a varnish coat or varnish coating or the like is not required. This is made possible among other things by the fact that the outwardly visible layers of all the outside surfaces can be pressed immediately and directly on the corresponding mold surfaces of the tool device.

The manufacturing method is simple and thus avoids defects, and reduces the reject rate.

While a particular embodiment of the present method of manufacturing a rim, rim, and tool device have been described herein, it will be appreciated by those skilled in the art that changes and modifications may be made thereto without departing from the invention in its broader aspects and as set forth in the following claims.

LIST OF REFERENCE NUMERALS 1 rim
2, 3 rim flank, rim side wall
4 rim base
5 rim well
6, 7 rim flange
8, 9 visible surface
10 hollow space
11 axis of symmetry
14 mold surface for forming the rim base
15 intersecting region
16 spoke hole
20 fibrous composite material
21 fiber layer, visible layer
21a reinforcement section
21b folded-over section
22 fiber layer, visible layer
22b folded-over section
23 fiber layer, visible layer
24 fiber layer
25 reinforcement layer
29 roving
30 prepreg
32 tube
41 pressing ring
42 pressing ring
50 tool device
51 molding device
51a molding unit
52 flank contact surface
54 rim base region
55 mold parting surface
56 fastener
57 alignment unit
61 molding device
61a molding unit
62 flank contact surface
64 rim base region
65 mold parting surface
67 alignment unit
70 auxiliary molding part
74 rim base region
75 mold parting surface
77 alignment unit
80 circular device, ring device 81-83 annular segments
84 rim well contact surface
85, 86 annular segments
87 alignment unit
90 locking ring
91 clamping portion
100 bicycle
101 wheel, front wheel
102 wheel, rear wheel
103 frame
104 fork, suspension fork
105 rear wheel damper
106 handlebar
107 saddle
109 spoke
110 hub
112 pedal crank

The invention claimed is:

1. A method of manufacturing a rim from a fibrous composite material, employing a tool device with a circular device and two molding devices comprising a left-side molding device and a right-side molding device, comprising the following steps:
one molding device of the two molding devices is selected and provided, which comprises a flank contact surface to form a lateral rim flank;
an auxiliary molding part of the tool device matching the selected molding device is connected with the selected molding device, so that the selected molding device together with the auxiliary molding part forms a mold surface for the rim base runs around an axis of symmetry of the rim, which is configured in sections on the selected molding device, and in sections, on the auxiliary molding part;
a first fiber layer of the fibrous composite material is applied to the flank contact surface of the selected molding device, which, constituting a visible layer, forms at least a major part of the visible surface of the pertaining rim flank;
wherein the first fiber layer is not only applied to the flank contact surface of the selected molding device, but also to the rim base region of the auxiliary molding part, to form a continuous first fiber layer in the region of the rim base;
the auxiliary molding part is removed from the selected molding device;
the other of the molding devices is provided, which comprises a flank contact surface to form the other, lateral rim flank;
a first fiber layer of the fibrous composite material is applied to the flank contact surface of the other of the molding devices, which, constituting a visible layer, forms at least a major part of the visible surface of the other of the rim flanks;
a plurality of annular segments are connected to form the circular device having a circumferential rim well contact surface, on which at least one first fiber layer of the fibrous composite material is applied, forming the rim well;
the circular device is placed against one of the molding devices, and the other of the molding devices is placed against it, and the circular device and the molding devices are connected with one another;
the fibrous composite material is allowed to set, and the annular segments and the molding devices are removed; and
after removing the rim from the tool device, spoke holes are made.

2. The method according to claim 1, wherein the fiber layers are pressed against the molding devices of the tool device, to ensure full-surface contact between the fiber layers and the flank contact surfaces,
and wherein all of the fiber layers, which form the visible outer surfaces as visible layers in use as intended, are pressed against the molding devices and the circular device of the tool device, to ensure full-surface contact between the fiber layers and the flank contact surfaces, and to prevent flaws on the visible surface, and to avoid refinishing work to the visible surface and in particular re-varnishing the outer surface to cover up air pockets and other flaws.

3. The method according to claim 2, wherein the first fiber layer applied to the selected molding device, forms the visible layer with the visible surface of the pertaining rim flank in the region of the flank contact surface, and in the rim base region of the auxiliary molding part, forms a reinforcement layer of the rim base but does not form the visible layer with the visible surface of the other of the rim flanks,
and wherein the two molding devices and the auxiliary molding part each show a mold parting surface running perpendicular to the axis of symmetry of the rim, where they are selectively placed against one another.

4. The method according to claim 1, wherein at least one reinforcement layer is incorporated in the two interconnected molding devices.

5. The method according to claim 1, wherein rim flanges are configured on the two rim flanks,
and wherein one rim flange is formed by fiber layers, which are applied to one of the molding devices and to the circular device,
and wherein one fiber layer on at least one rim flange is folded over at the radially outwardly edge and is radially folded back inwardly.

6. The method according to claim 1, wherein all the visible surfaces on the finished rim are formed by the two molding devices and the circular device.

7. The method according to claim 1, wherein the circular device comprises at least two annular segments in the peripheral direction,
and wherein the circular device comprises at least two annular segments in the axial direction transverse to the peripheral direction, wherein the axially central annular segments are configured in a wedge shape,
and wherein a locking ring is placed on the outside around the interconnected molding devices and the circular device.

8. The method according to claim 1, wherein the tool device loaded with the fiber layers is evacuated,
and wherein the tool device is inserted into a pressure device and heated.

9. The method according to claim 1, wherein prepregs are used for fiber layers, and wherein resin material is inserted.

10. The method according to claim 1, wherein an inflatable tube is inserted, prior to connecting the molding devices with the circular device, and wherein, after fastening the molding devices to the circular device, the tube is inflated.

* * * * *